C. E. GRILL.
GUN.
APPLICATION FILED APR. 9, 1921.
1,402,159.
Patented Jan. 3, 1922.
3 SHEETS—SHEET 1.
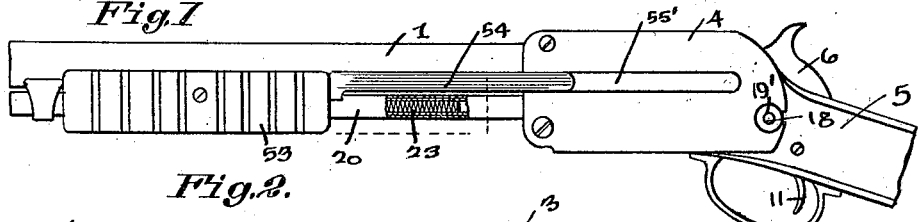
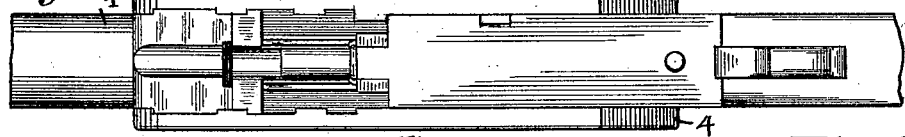
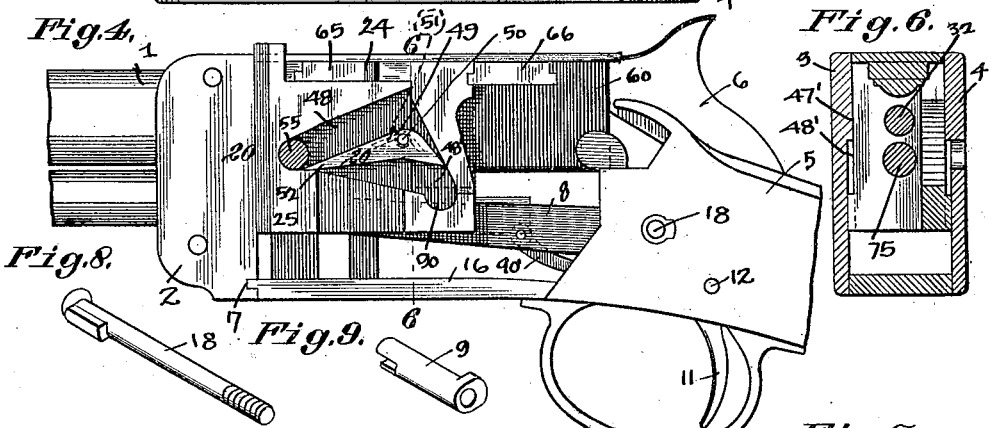
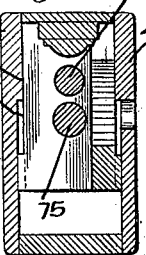
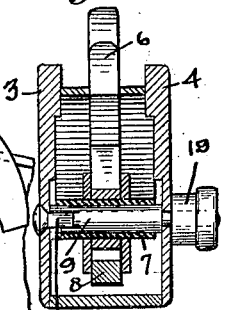
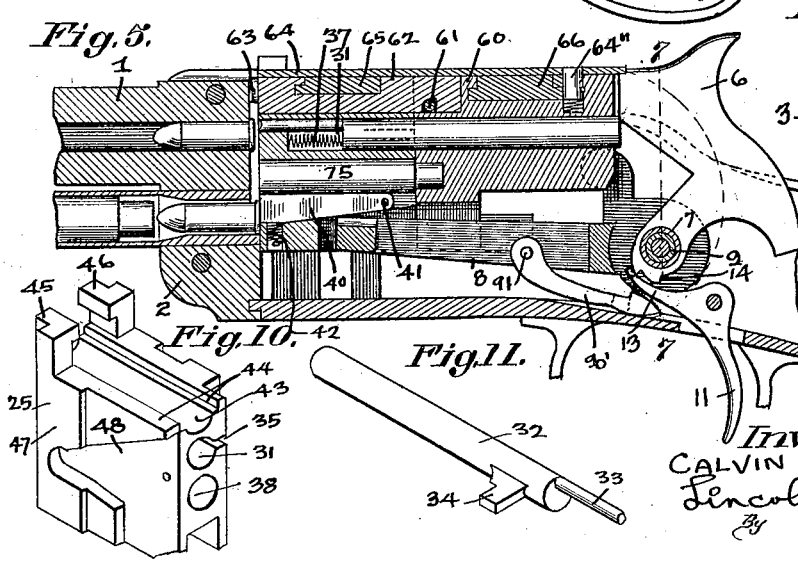
Inventor,
CALVIN E. GRILL
Lincoln Johnson
By
Attorney

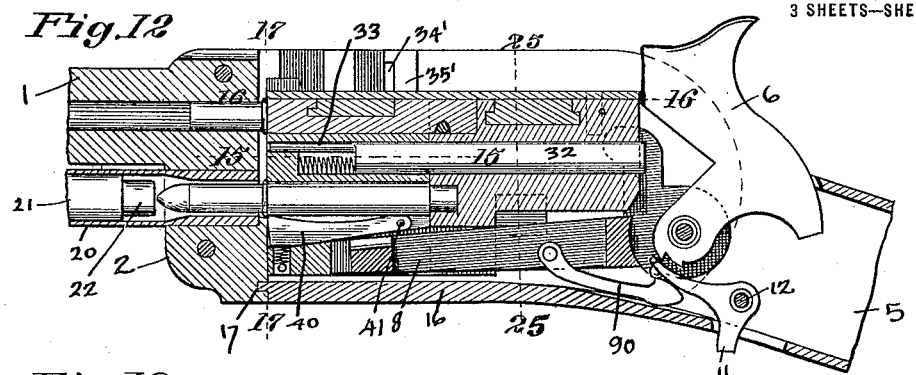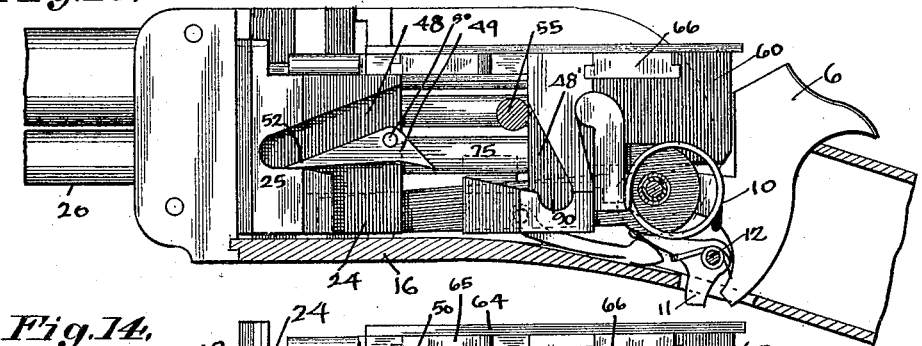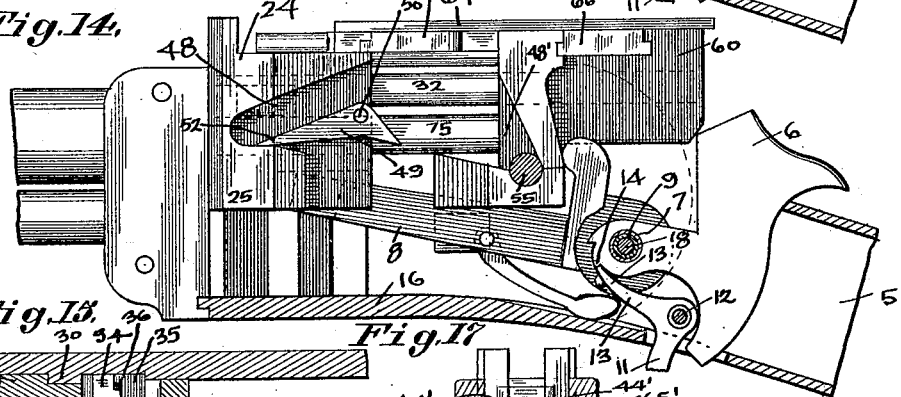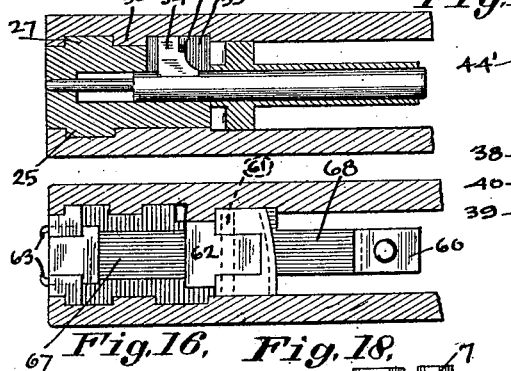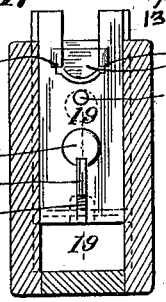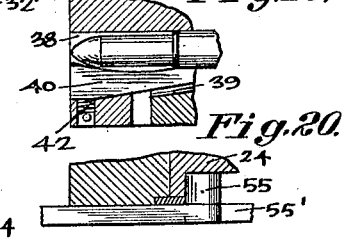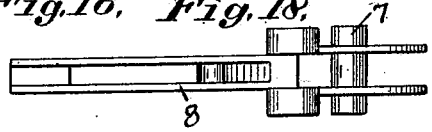

C. E. GRILL.
GUN.
APPLICATION FILED APR. 9, 1921.

1,402,159.

Patented Jan. 3, 1922.
3 SHEETS—SHEET 3.

Inventor,
CALVIN E. GRILL

By Lincoln Johnson
Attorney

UNITED STATES PATENT OFFICE.

CALVIN E. GRILL, OF SAN FRANCISCO, CALIFORNIA.

GUN.

1,402,159.      Specification of Letters Patent.      Patented Jan. 3, 1922.

Application filed April 9, 1921. Serial No. 460,042.

*To all whom it may concern:*

Be it known that I, CALVIN E. GRILL, a citizen of the United States, and a resident of the city and county of San Francisco, State of California, have made a new and useful invention—to wit, Improvements in Guns; and I do hereby declare the following to be a full, clear, concise, and exact description of the same.

This invention relates particularly to improvements in gun actions.

The further object of this invention is to automatically provide a gun action for extracting a discharged shell from the barrel of the gun and placing an unused shell therein.

A further object consists in providing a gun action that will be superior in point of simplicity, and inexpensiveness of construction, positiveness of operation, facility and convenience in use and general efficiency. A still further object relates to the improved combined breech-block and extractor and to the mechanism for operating the same. A still further object relates to the separable construction of the extractor block permitting any worn parts thereof to be re-placed.

A further object is to provide a safety mechanism to prevent a premature releasing of the firing pin hammer.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying three sheets of drawings,

Figure 1 represents a partial side elevation of a gun having an action constructed in accordance with my invention applied thereto.

Figure 2 represents an enlarged plan view of Figure 1 in the firing position.

Figure 3 represents an enlarged plan view of Figure 1 in the discharged position.

Figure 4 represents a sectional side elevation of Figure 2 illustrating the mechanism immediately after operation of the firing pin hammer.

Figure 5 represents a vertical sectional view taken through Figure 2 on the line 5 in the initial or firing position.

Figure 6 represents a cross-sectional view taken through Figure 4 on the line 6—6.

Figure 7 represents a cross-sectional view through Figure 5 on the line 7—7.

Figure 8 is a perspective view of the bolt for securing the combined barrel and gun action to the stock.

Figure 9 represents a perspective of a bushing through which the bolt illustrated in Figure 8 passes.

Figure 10 represents an isometric view of the breech-block.

Figure 11 is a perspective view of the firing pin.

Figure 12 is a vertical sectional view taken through Figure 2 on the line 12 in a position to extract a discharged shell from the gun barrel and a loaded shell from the gun magazine.

Figure 13 is a vertical section showing the gun action after the discharged and loaded shells have been drawn from the barrel and magazine respectively.

Figure 14 is a similar vertical section showing the combined breech-block and extractor in an elevated position to discharge the used shell and to place the loaded shell in the barrel.

Figure 15 represents a plan sectional detail taken on the line 15—15 of Figure 12.

Figure 16 represents a plan section in detail taken on the line 16—16 of Figure 12.

Figure 17 represents a cross-sectional view through Figure 12 on the line 17—17.

Figure 18 represents a plan view of the arm for elevating the combined breech-block and extractor.

Figure 19 is a sectional detail of the shell repository in the breech-block taken on the line 19—19 of Figure 17.

Figure 20 represents a plan section of the connection between the fore-arm lever and combined breech-block and extractor.

Figure 21:
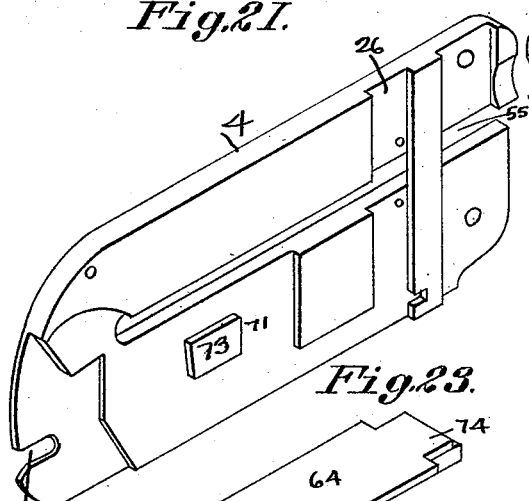
Figure 21 represents an inside perspective of the inner face of the chamber inclosing a gun action.

In detail the construction illustrated in the drawings comprises a gun barrel 1 of any desirable length and calibre, rigidly fixed in an end partition member 2, to which the side plates 3 and 4 comprising an enclosing chamber for the gun action, are adapted to be rigidly secured. The gun stock 5 is provided with a firing pin hammer 6 therein, pivotally mounted on a bushing 7, secured in an end of a tongue member 8, adapted to elevate the combined breech-block and extractor, (to be hereinafter described in detail) said hammer and elevating tongue being pivotally mounted within the said stock on a bushing 9, shown in Figure 9, passing through the hollow bushing 7 in said tongue member. The hammer 6 is connected to the elevating tongue 8 by the main spring 10 normally adapted to resist any movement of the firing hammer relative to said tongue member. To hold the firing hammer 6 in the "cocked" position, a trigger 11 is mounted on the pintle pin 12 in the said stock and has an end 13 thereof engaging suitable notches or latches 14 provided in the firing hammer 6. The underside of the stock is provided with an extended lip 16 fitting snugly between the side walls 2 and 3 and with the end thereof engaging a suitable depression 17 formed in the inner face of the end partition 2. The stock is rigidly held to the barrel and "gun-action" casing by passing a suitable pin or bolt 18 through companion notches 19 in the ends of the sides 2 and 3 and through the interior of the hollow bushing 9. A suitable binding nut 19' or other equivalent fastening means is adapted to be mounted on the bolt 18 for locking the assembly in fixed position.

The barrel 1 is provided with the usual shell magazine 20 rigidly secured thereto in spaced parallel alignment therewith. Shells are adapted to be placed in said magazine 20 in an obvious manner and ejected therefrom by a push-rod 21 having a button 22 in the end thereof under the tension of the compression spring 23 within the rod 20 and which is adapted to bear against said shells.

A breech-block 24 is mounted between the side walls 3 and 4 contiguous to the end of the barrel, magazine and the end partition 2, and on one side thereof is provided with a projecting guide 25 that is adapted to move in the slideway 26 milled in the inner face of the side 4. The opposite side of the breech-block is provided with a companion guide member 27 that is adapted to move in the slideway 28 formed in the inner face of the side wall 3. The guide 27 has a depression 29 milled therein that is adapted to engage a companion projection 30 formed within the slideway 28 in the plate 3 to limit the vertical movement of the said breech-block relative to said plate. The breech-block is drilled longitudinally as at 31 and 32' with holes of different diameters to receive the firing pin shaft 32 and the firing pin 33, respectively. The firing pin shaft is also provided with a lug projection 34 thereon fitting into a milled keyway 35 contiguous to the shaft 31 for the purpose of preventing any rotary movement of said firing pin shaft or firing pin. A suitable locking means 36 is passed through the opening 35 to engage the lug projection 34 and retain the firing pin and shaft within the breech block. A compression spring 37 is mounted within the opening 31 and is adapted to expand against the firing pin shaft for the purpose of keeping the point of the firing pin 33 away from the front face of the breech block. After the breech-block is slidably mounted between the sides 3 and 4, the projection 34 on the firing pin projects out of the keyway 35 sufficiently to engage a slotted depression 34' in a projecting surface 35' formed on the inside face of the side 3. The aforementioned engagement limits the ordinary vertical movement of the breech-block to the length of the slot 34', further vertical movement of said breech-block being obtained by passing the lug 34 out of engagement with the ends of the slot 34' and which in the operation of the gun action is done automatically by engagement of the firing pin hammer with the firing pin.

The breech-block is also drilled longitudinally as at 38 in alignment with the firing pin cavity to provide a shell repository, said repository being slotted as at 39 throughout its entire length to provide a socket that is adapted to receive an arm 40 pivoted at 41 within said slot. At its opposite end the arm 40 is provided with a tension spring 42 thereunder that is adapted to move the same into the shell repository and thus control and regulate the number of shells that are to be passed from said shell magazine into said repository. The upper surface of the arm 40 is slightly depressed or bowed, as shown in Figures 12 and 19, so that a shell when placed within said repository will rest on the depressed portion of the arm permitting the end thereof to lift and enter the repository and thus keep further shells from the magazine from entering.

The upper part of the breech-block is milled to provide a substantially semi-circular depression that is co-axial with the axes of the firing pin and shell repository. The opposite sides of said depression 43 terminate in flat, planal slide surfaces 44. That part of the breech-block adjacent the barrel and magazine has parallel walls 45 and 46, respectively, extending above the plane of the slideways 44 and has portions thereof extending inwardly over said slides, to provide a guide-way, for the purpose to be hereinafter described in detail.

The face 47 of the breech-block has an angular walled depression 48 milled therein. A latch member 49 is adapted to be mounted within said depression 48 on a pivot pin 50 and has a spring 51 therein that is adapted to bear the end 52 of said latch member against the lower wall of the depression 48 so as to provide a substantial parallel slideway, as shown in Figure 4. A fore-arm block 53 is slidably retained on the shell magazine 20 and has an extended portion 54 and an inwardly projecting lug 55 thereon, said arm 54 being slidably guided in a slot 55' provided through the side plate 4 permitting the projection 55 on said arm to fit into the depression 48 formed in the side of the breech block 24. Thus the angularity of the walls of the depression 48 is such, acting in co-operation with the latch member 49 that longitudinal movement of the fore-arm pin 50 within said depression lowers the breech-block vertically, in the respective guide slots 26 and 28.

The shell extractor or ejector comprises, a main body portion 60 and is normally adapted to be slidably mounted on the breech-block 24. The upper face of the extractor body 60 adjacent the point where it contacts with the breech block is provided with a socket therein and through which a pin 61 projects. An extractor element 62 is provided with a depression in an end thereof that is adapted to engage in the socket and projection 61 to form a demountable connection therewith. The opposite end of said extractor element is provided with spaced, parallel shell gripping fingers 63 adapted to pass around the beaded end of a shell for the purpose of withdrawing the same from the barrel or magazine. The shell extractor element 62 and the body portion 60 are held in fixed relation by a cover plate 64 having a pair of projections 65 and 66 respectively, on the under face thereof engaging companion milled depressions 67 and 68, respectively, formed in the said extractor element 62 and the body element 60. (By reference to Figure 16, this construction is clearly shown.) The cover plate 64 is appropriately slotted on the edge adjacent the side 3 so as to receive the projecting guide 35' provided on the side 3. The cover plate 64 is also provided with an opening 64' therethrough into which the spring latch 64" mounted in the body element 60 is adapted to be engaged. The said latch member is depressible if it is desired to remove the cover plate 64 from engagement with the respective elements to replace the extractor member 62. The replaceable extractor element 62 is provided with a substantially semi-circular under face 65' thereon and with appropriate parallel side edges 44' resting upon the respective curved depressions 43 and parallel slides 44. The front end 74 of the plate 64, where secured to the extractor element 62, is adapted to fit within the retaining housing formed between the vertical projections 45 and 46 on the front end of the breech-block to prevent any disarrangement of the extractor relative to said breech-block.

Figure 22:
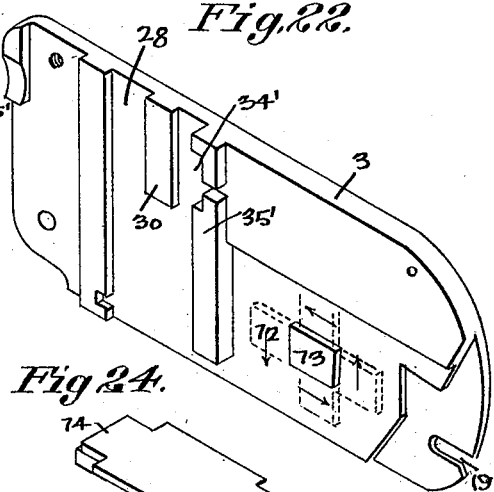
Figure 22 represents an inside perspective of the inside face of the plate on the opposite side.
Figure 23:
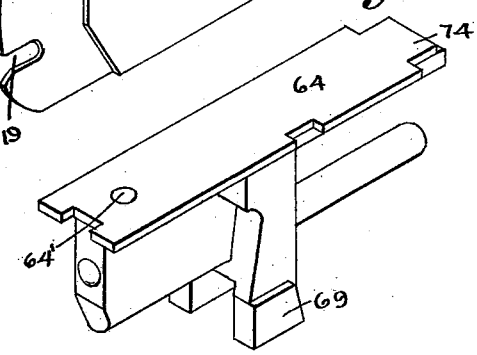
Figure 23 is a perspective of the extractor block showing the face thereof adapted to contact with the inside face of the chamber indicated on Figure 22.
Figure 24:
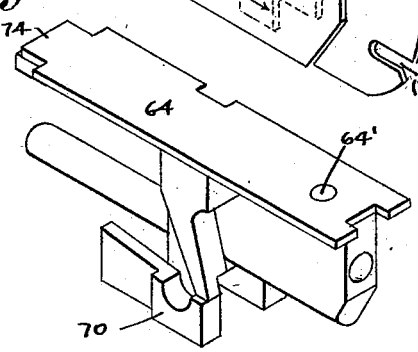
Figure 24 is a perspective of the opposite side of the extractor adapted to co-operate with the chamber face shown in Figure 21.
Figure 25:
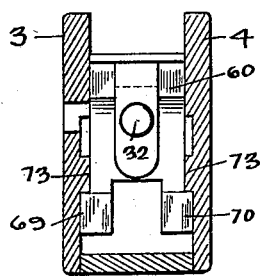
Figure 25 is a cross-section taken through Figure 12 on the line 25—25 showing the extractor block in the lowered position.
Figure 26:
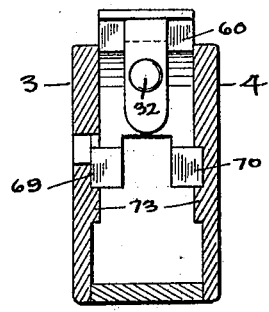
Figure 26 is a cross-section taken through Figure 14 on the line 26—26 showing the extractor block in the elevated position.
Figure 27:
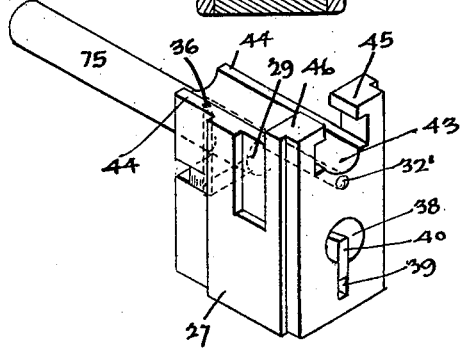
Figure 27 is a perspective of the breech-block.

The opposite sides of the extractor are provided with projections 69 and 70 respectively that fit into vertical slides 71 and 72, indicated in Figures 21 and 22 respectively. The projection 73 formed in each of the sides 3 and 4 acts as a guide for limiting and controlling the vertical or longitudinal movement of the assembled extractor body, co-operating with the slideways 26 and 28. In the operation of the gun action each of the respective lugs 69 and 70, on the extractor block, are adapted to move entirely around the projection 73 as indicated roughly by the dotted line in Figure 2. The extractor block 60 is drilled longitudinally as at 31' providing an opening into which the shaft 32 of the firing pin is adapted to be slidably retained. In alinement with said last mentioned opening, the extractor body is drilled and a shell ejector or loader 75 mounted therein, said shell loader on the extractor body being in registry with the shell repository formed in the breech-block and adapted to be slidable longitudinally with respect thereto. The side 47' of the body portion 60 of said extractor block at 48' is milled appropriately to correspond with the companion milled depression 48 formed in the breech-block, and the sides of the milled depression 48' are likewise angularly deposed.

The gun and the action therefore is operated in the following manner:

Figures 1, 2, 4 and 5 illustrate the initial position of the cycle of operation showing the hammer, either just in the position to contact with the firing pin and discharge the shell or in a position to be "cocked" into operative position. Assuming that the hammer has been released by the trigger and moved from the "cocked" position and permitted to hit the firing pin and explode the shell, the next operation would be to place the gun into operating position. For so doing, the operator would grasp the fore-arm block 53 and pull it rearward towards the stock of the gun thereby moving the arm 54 with the inwardly projecting lug 55 thereon, within the angular walled depression 48 in the breech-block against the upper edge of the latch member 49, moving the said breech-block, with the extractor slidably mounted thereon, downwardly to the position shown in Figures 12 and 13. In this position (Figure 12) the extractor element 62 is placed in registry with the barrel of the gun so that the gripping fingers 63 on said extractor pass around the beaded end of the discharged shell in the barrel. Synchronously with the engagement of the extractor element with the discharged shell, the shell repository beneath said extractor element in the breech block is positioned in registry with the shell magazine as shown in Figure 12. The lowering movement described is obtained by the guides 27 in the breech-block moving in the slideways 26 and 28 formed in the sides 3 and 4. The extractor body being slidably movable longitudinally with respect to the breech block, is provided with the projecting faces 69 and 70 moving in the corresponding slideways 71 and 72, contiguous to the block 73, formed in each of the side faces 3 and 4. It is to be observed that after the hammer has contacted with the firing pin shaft and exploded the shell, the lug 34 on the firing pin shaft is moved out of engagement with the opening 34' in the side wall 3 into the slideway 28. The disengagement of the said lug permits the combined breech-block and extractor body to be lowered beneath the lower edge of the said slideway 34'. At the end of the first cycle of movement as indicated in Figure 12, the breech-block would be placed at its lowermost position within the "gun-action" chamber and the respective lugs 69 and 70 on the extractor body, out of engagement with the lowermost edge of the guide block 73 on the side plates 3 and 4 of said inner chamber. Continued rearward movement of the lug projection 55 in the second cycle of operation would move the extractor block longitudinally relative to the breech-block as shown in Figure 13, withdrawing the discharged shell from the barrel and moving the shell loader 75 out of the shell repository of the breech-block so as to permit a loaded shell from the shell magazine being passed into said repository, substantially as shown by Figure 19. The rearward movement of the extractor block tends to depress the elevating arm 8 and at the same time to move the hammer 6 radially against the tension of the main spring 10 into the "cocked" or operative position where it is fixedly held by engagement of the arm 13 on the trigger with the companion notch 14 on said hammer. The length of movement of the extractor block is such that the trigger arm 13 is not permitted to contact with the notch 14 in the hammer, until the respective lugs 69 and 70 on said extractor body pass beyond the rearmost edge of the guide projection 73 on the side plates 3 and 4, as shown in dotted lines in Figure 22, into the third cycle of operation, at which point the main spring 10, which has been placed under tension in the "cocking" action, exerts an upward force on the elevating member 8 lifting the combined breech-block and extractor body, upwardly, to the position shown in Figure 14, placing the lugs 69 and 70 on the extractor block above the lug projection 73 in the side plates due to a slight forward movement of the extractor block imparted by the hammer 6 contacting with the edge thereof, until the trigger arm 13 engages with the notch 14. This position, or fourth cycle of operation, is shown in Figure 14 where the moving lug 55 on the fore-arm mover rests in a depression 90 formed in the milled-out portion 48' of the extractor block so that the forward movement of the extractor block over the upper face of the lug 73 moves the unloaded shell held in the extractor fingers, to a point over the barrel and at the same time the shell loader 75 moves forwardly within the shell repository and pushes the loaded shell therefrom into the barrel.

The final step in the cycle of operation would be that of moving the fore-arm lug 55 out of the depression 90 and along the inclined surface leading into the depression 48, formed in the breech-block which movement would tend to move the combined breech-block and extractor downwardly relative to the barrel and incasing chamber discharging the unloaded shell from the extractor fingers, moving the shell repository out of registry with the barrel and placing the firing hammer and pin into registry with the loaded shell into the gun barrel. The operator would then pull the trigger to release it from engagement with the firing pin hammer which would be moved forward due to the tension of the main spring 10 causing it to strike the firing pin and the said last mentioned part to strike the loaded shell in an obvious manner. To prevent the firing hammer from striking the firing pin at any time during the cycle of operation except when in the position shown in Figure 5, a safety latch 90' is pivoted at 91 to the elevating arm 8 so that the end of said latch rests under the trigger arm 13 and as shown in Figure 14 prevents the operation of said firing hammer. It is to be understood, however, that any equivalent means could be utilized for serving a similar purpose and I do not wish to be understood as limiting myself to the particular type of "safety" device illustrated.

Having thus described this invention, that I claim and desire to secure by Letters Patent is:

1. A gun comprising a barrel; a breech-lock, having a shell extracting means thereon and a shell repository therein, movable vertically relative to said barrel and means for placing a shell in said repository and moving the same into said barrel.

2. A gun comprising a barrel; a shell magazine mounted on said barrel in spaced parallel alignment therewith; a breech-lock, having a shell extracting means thereon and a shell repository therein, movable vertically relative to said barrel and magazine and adapted to receive a shell from said magazine and place the same into said barrel.

3. A gun comprising a barrel; a breech-lock, having a shell repository therein, movable relative to said barrel; an extractor mounted on said breech-block, and movable therefrom and adapted to remove a shell from said barrel and means for placing a shell from said repository in said barrel.

4. A gun comprising a barrel; a breech-lock, having a shell repository therein, movable vertically relative to said barrel; an extractor mounted on said breech-block, and movable longitudinally therefrom, adapted to remove a shell from said barrel and means for placing a shell from said repository in said barrel.

5. A gun comprising a barrel; a breech-lock, having a shell repository therein, movable relative to said barrel and means for placing a shell in said repository; an extractor slidably mounted on said breech-lock and movable relative thereto, said extractor being adapted to remove a shell from said barrel synchronously with the placing of a shell in said repository and means on said extractor for removing a shell from said repository into said barrel.

6. A gun comprising a barrel; a shell magazine mounted on said barrel in spaced parallel alignment therewith; a breech-lock, having a shell repository therein, movable vertically relative to said barrel and magazine; means in said magazine for placing a shell into said repository; an extractor body slidably mounted on said breech-block and movable longitudinally therefrom and adapted to remove a shell from said barrel and means on said extractor body for removing a shell from said repository into said barrel.

7. A gun comprising a barrel; a shell magazine mounted on said barrel in spaced parallel alignment therewith; a breech-lock, having an extractor slidably mounted thereon and a shell repository therein movable vertically relative to said barrel and magazine, said extractor and repository being spaced a distance equivalent to that of the barrel and magazine.

8. A gun comprising a barrel; a shell magazine mounted on said barrel in spaced parallel alignment therewith; a breech-block, having an extractor slidably mounted thereon and a shell repository therein movable vertically relative to said barrel and magazine, said extractor and repository being spaced a distance equivalent to that of the barrel and magazine and normally out of registry therewith; means for placing said barrel and extractor, and magazine and repository into registry; means for moving said extractor longitudinally relative to said breech-block to withdraw, respectively, a shell from said barrel and a shell from said magazine into said repository; means for placing said repository into registry with said barrel to permit a shell therefrom passing into said barrel and means for placing said barrel and repository out of registry into the initial position.

9. A gun comprising a barrel; a shell magazine mounted on said barrel in spaced parallel alignment therewith; a breech-block, having a shell repository therein, movable vertically relative to said barrel and magazine; means in said magazine for placing a shell into said repository; an extractor body slidably mounted on said breech-block and movable longitudinally therefrom and adapted to remove a shell from said barrel and means on said extractor body for removing a shell from said repository into said barrel, said extractor body comprising, a shell engaging element hingedly secured to said extractor body and a cover plate removably secured to said shell engaging element and extractor body.

10. A gun comprising a barrel breech-block, shell extractor and a firing pin hammer; said breech block having a shell repository therein, movable vertically relative to said barrel; a firing pin in said breech-block; an extractor slidably mounted on said breech-block adapted to remove a shell from said barrel and synchronously move said firing pin hammer radially and means on said extractor movable within said breech-block repository to eject anything therein contained into said barrel.

11. A gun comprising in combination a barrel, breech-block, shell extractor and firing pin hammer; a firing pin in said breech-block; said breech-block being movable vertically relative to said barrel and having, said extractor slidably mounted thereon and a shell repository therein, each of which are normally out of registry with said barrel; means for placing said extractor into registry with said barrel and said repository into a position to be filled; means for moving said extractor to withdraw a shell from said barrel and to fill said breech-block repository synchronously with the imparting of a radial movement to said firing pin hammer; means for placing said breech-block repository into registry with said barrel and to permit a shell therefrom passing into said barrel and to discharge the shell from said extractor; and means for placing said repository out of registry with said barrel into the initial position to align said barrel, firing pin and hammer.

12. A gun comprising in combination a barrel, breech-block, shell extractor and firing pin hammer; a firing pin slidably retained in said breech block; spring means for resisting movement of said hammer away from said barrel; said breech-block being movable vertically relative to said barrel and having said extractor slidably mounted thereon and a shell repository therein, each of which are normally out of registry with said barrel; means for placing said extractor into registry with said barrel and said repository into a position to be filled; means for moving said extractor to withdraw a shell from said barrel and to fill said breech-block repository synchronously with the imparting of a radial movement to said firing pin hammer; means for placing said breech-block repository into registry with said barrel and to permit a shell therefrom passing into said barrel and to discharge the shell from said extractor; and means for placing said repository out of registry with said barrel into the initial position to align said barrel, firing pin and hammer.

13. A gun comprising in combination a barrel, breech-block, shell extractor and firing pin hammer; a shell magazine mounted on said barrel in spaced parallel alignment therewith; a firing pin slidably retained in said breech-block; spring means for resisting movement of said hammer away from said barrel; said breech-block being movable vertically relative to said barrel and having said extractor slidably mounted thereon and a shell repository therein, each of which are normally out of registry with said barrel and shell magazine respectively; means for lowering said extractor and repository into registry with said barrel and shell magazine respectively; means for moving said extractor to withdraw a shell from said barrel and to fill said breech-block repository from said shell magazine synchronously with the placing of said hammer into operative position away from said barrel; spring means for elevating said repository into registry with said barrel and to permit a shell therefrom passing into said barrel and to discharge the shell from said extractor; and means for placing said repository out of registry with said barrel into the initial position to align said barrel, firing pin and hammer.

In testimony whereof, I have hereunto set my hand at San Francisco, California, this 31st day of March 1921.

CALVIN E. GRILL.

In presence of—

LINCOLN V. JOHNSON.